UNITED STATES PATENT OFFICE.

THOMAS CHARLES SANTLER, OF MALVERN LINK, ENGLAND.

MOTOR-PLOW.

1,338,195.   Specification of Letters Patent.   Patented Apr. 27, 1920.

Application filed March 8, 1918. Serial No. 221,231.

*To all whom it may concern:*

Be it known that I, THOMAS CHARLES SANTLER, a subject of the King of England, residing at Malvern Link, Worcestershire, in England, have invented certain new and useful Improvements in Motor-Plows, of which the following is a specification.

This invention relates to motor plows of the type which is operative when driven in either direction and has for its object to effect certain improvements in the construction, arrangement and operation of such plows.

According to this invention the plow comprises a motor which is mounted on a frame provided with an axle driven by the motor and disposed about the center of the length of the frame this axle carrying a driving wheel at one or both ends and one of these wheels being so mounted that it can be raised and lowered with relation to the frame while the other wheel if provided may be removable so that the drive will be transmitted to the remaining wheel only. Steering wheels are disposed toward each end of the frame and at or near one side thereof and plow shares are adjustably suspended from the frame on either side of the central driving axle and arranged so that the share or shares on one side of this axle are directed oppositely to the share or shares which are situated toward the other end of the frame and on the other side of the driving axle.

The driving wheel which is vertically adjustable whether it is the only driving wheel or is one of a pair is positioned at one side of the frame while the steering wheels of which there are preferably two positioned one toward each end of the frame are arranged in line with each other and at or near the opposite side of the frame. The latter thus runs either on three wheels, namely one driving wheel which is centrally placed at one side and two steering wheels on the opposite side and respectively at the ends of the frame, or on four wheels namely one driving wheel which is centrally placed at one side and three wheels on the other side these three wheels being the two steering wheels which are in line and respectively at the ends of the frame and the second driving wheel which is in the center of that side.

The plow shares are positioned toward the opposite ends of the frame and near that side thereof on which the adjustable driving wheel is placed. Drag links run to these shares from some suitable central point which may conveniently be a bracket which projects downwardly from the frame and may form part of or be connected to the guide in which slides the axle box of the adjustable driving wheel. One or more shares may be provided toward each end of the frame.

There are two seats which face each other from opposite sides of the driving axle and adjacent to each seat is a steering wheel and a lever by means of which the plow shares can be raised or lowered. By thus duplicating the mechanism for steering and for raising and lowering the shares the machine can be driven equally well in either direction and at the end of a furrow the driver merely has to change into the other seat when he can operate the plow as desired. As the plow thus has not to be turned at the end of each furrow the latter can be carried close up to the border of the field and consequently there need be little or no space wasted and the ground at the ends of the field is not liable to be pressed down hard by the repeated passing of the machine over it in turning.

The accompanying drawings illustrate by way of example one construction of plow in accordance with this invention. In these drawings:—

Like letters indicate like parts throughout the drawings.

The frame of the plow is conveniently rectangular when viewed in plan and built up of lateral members A A' and end members A² A³ these members being formed and connected as found convenient and suitable for the purpose.

Figure 3:
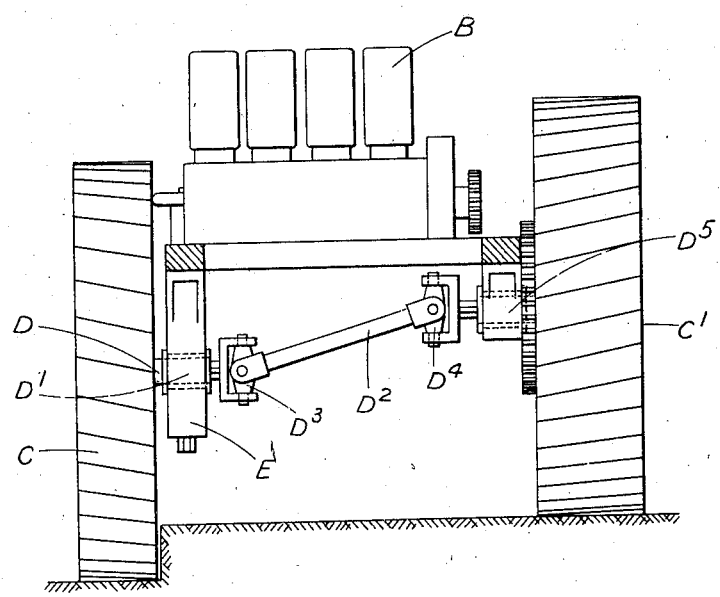
Fig. 3 is a somewhat diagrammatic vertical transverse section through the driving wheel axle.

About the center of the frame is placed an internal combustion engine B of suitable type that shown in the drawings having for example four cylinders. The engine crank shaft lies transversely across the frame and the drive is transmitted by chain or toothed wheels to an axle situated beneath the engine. The drive is controlled in the usual manner by means of a clutch and variable speed gearing may be provided if desired. Driving wheels C C' of suitable diameter are mounted on the opposite ends of the axle driven by the engine and at some point in the length of this axle is a universal joint. That end D of this axle on which the driving wheel C is mounted is carried in a box D' which can slide vertically in a guide E. The universal joint above mentioned may comprise conveniently a coupling member $D^2$ which extends between two universal joint members $D^3$ $D^4$ as shown in Fig. 3. The coupling member $D^2$ is connected at one end by the joint $D^3$ to the adjustable part D of the driving axle while at its other end the coupling member $D^2$ is connected by a joint $D^4$ with the axle part $D^5$ which is carried in fixed bearings. The axle part $D^5$ is driven by gearing from the motor B and the drive is transmitted to the road wheel C through the universal joint irrespective of the vertical position of the end D of the driving axle with relation to the frame and engine. The road wheel C' which may be detachable is mounted on the outer end of the part $D^5$ of the driving axle. The vertical movement of the end D of the axle is controlled by means of a lever F pivoted for example at F' on a bracket E' formed at one side of the guide E one end of this lever F being connected by a link $F^2$ to the axle box D'. The other end of the lever F can be moved by means of a screw threaded rod G one end of which is connected to the lever F while the other end carries a hand wheel G' the screw threaded portion of this rod passing through a fixed correspondingly screw threaded sleeve. By turning the hand wheel G' the wheel C can be raised or lowered with relation to the frame of the plow and in this way the level of the plow share can be adjusted when the driving wheel C runs during operation of the plow in the last formed furrow.

Two steering wheels H and H' are mounted in forks J and J' pivoted at opposite ends of the side member A of the frame. These steering wheels H H' are positioned in line at that side of the vehicle which is opposite to the main driving wheel C as it may be termed. Each steering wheel fork J J' is provided with a laterally extending lever arm $J^2$ and from these arms extend rods $J^3$ running toward the center of the vehicle. A horizontally disposed drum is situated at some convenient point about the center of the vehicle and chains which pass around this drum extend in either direction to points in the length of the rod $J^3$ toward the opposite ends of the vehicle. The chain drum can be rotated by bevel gear operated by either of the two steering wheels K K' each of which is placed conveniently adjacent to a seat L or L'. These seats as will be seen face each other on opposite sides of the engine B. The details of the steering mechanism are not shown as they are substantially of known type and other types of steering mechanism may be employed if preferred.

The plow as above described runs normally on four wheels namely the two driving wheels C C' and the two steering wheels H H'. If desired the driving wheel C' which lies on the same side of the vehicle as the steering wheels H H' can be removed when it is necessary to lock in some convenient manner that end of the driving axle since a differential gear is preferably disposed at some point on this axle. The vehicle then runs on the two steering wheels H H' and the single main driving wheel C. The details in the structure of the driving axle may vary in accordance with requirements and known practice in order to effect the drive in the manner indicated.

Suspended from the frame and toward each end thereof are two plow shares M M' and $M^2$ $M^3$. The points of the shares are directed toward the center of the length of the vehicle so that the two shares M M' face oppositely to the two shares $M^2$ $M^3$. The two shares M and $M^2$ lie in the same longitudinal line and substantially beneath the side member A of the frame. The two shares M' and $M^3$ are positioned in line but more toward the center of the vehicle and respectively farther toward its opposite ends so that parts of these shares lie beneath the frame end members $A^2$ and $A^3$. All the plow shares are placed preferably on the same side of the longitudinal center line of the vehicle as the main driving wheel C. The lateral spacing between the shares M M' and between the shares $M^2$ $M^3$ corresponds with the distance between two adjacent furrows and the main driving wheel C is spaced laterally a similar distance from the line in which lie the two shares M $M^2$. The width of the tread of the driving wheel C preferably approximates to the width of the bottom of a furrow turned up by the plow shares. Thus when two of the shares for example $M^2$ and $M^3$ are plowing the wheel C will run in the last formed furrow.

Figure 1:
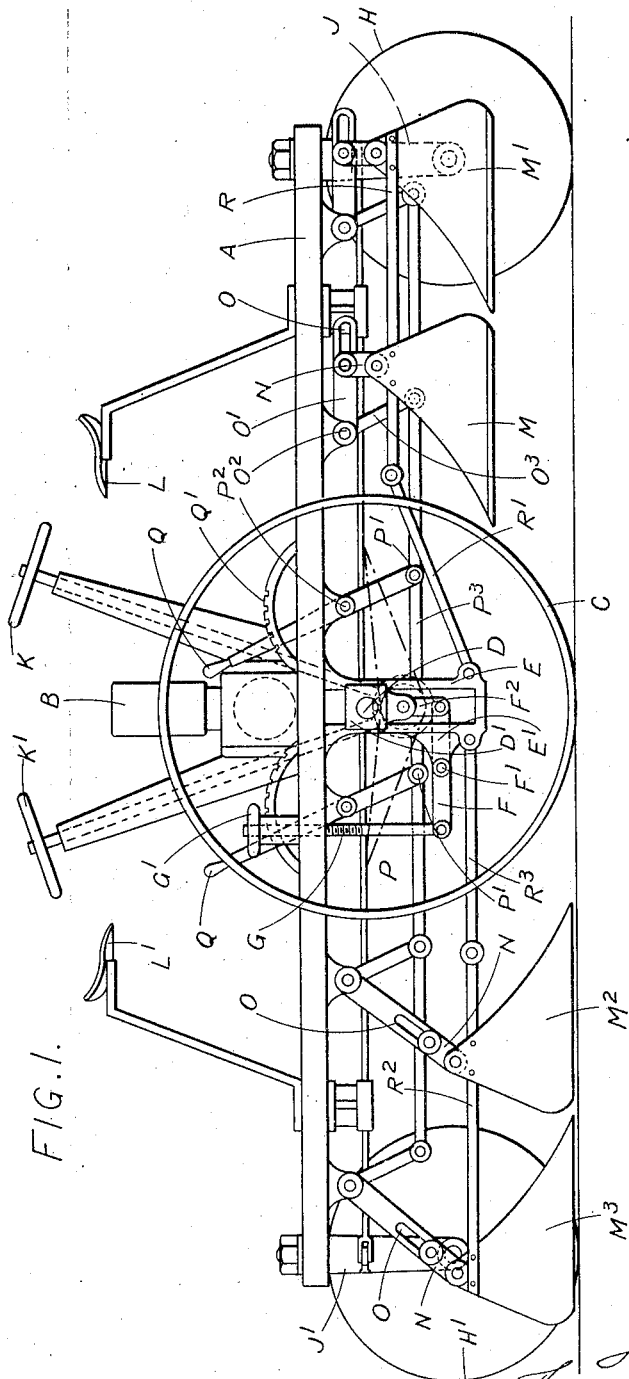
Figure 1 is a side elevation of the improved plow.
Figure 2:
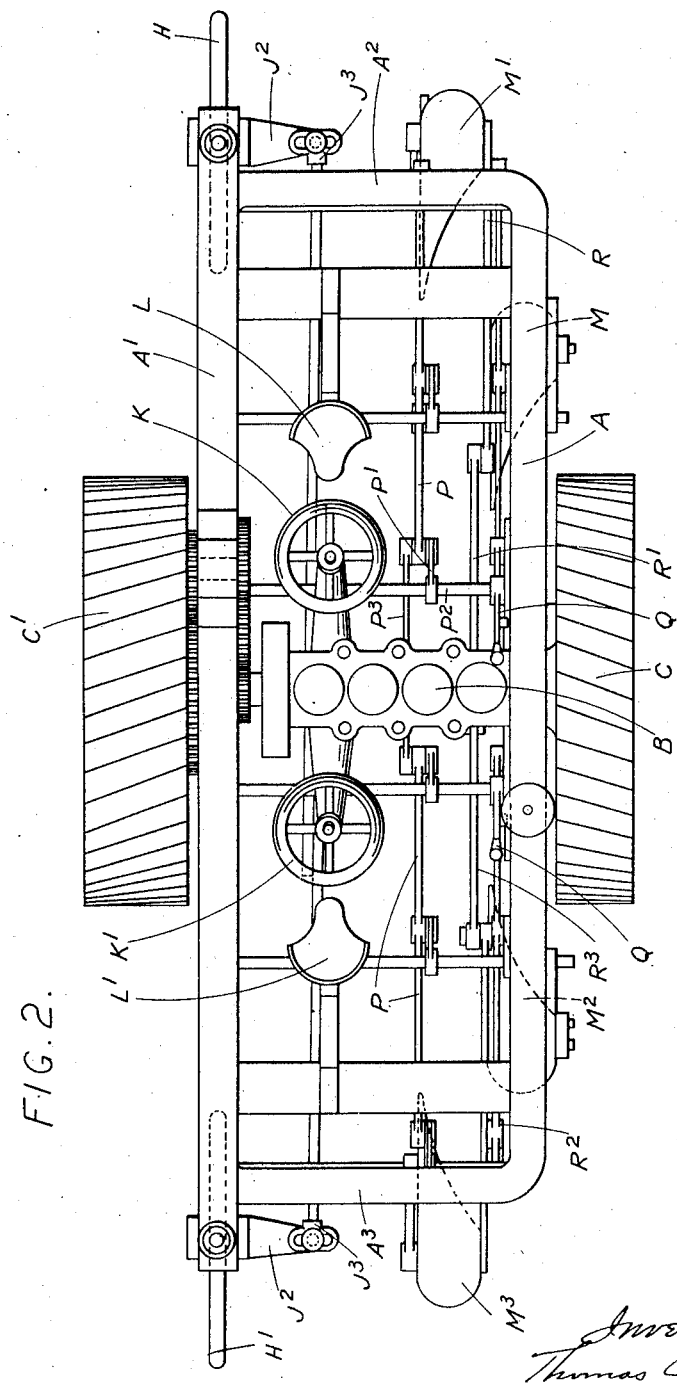
Fig. 2 is a plan of the same.

Each plow share is suspended by a link N which is pivotally connected at one end to the share and at the other end to a slot O formed in one arm O' of a bell crank lever pivoted at $O^2$. The other arm $O^3$ of this bell crank lever is pivotally connected to a rod P attached at one end to a lever P' on a rock shaft $P^2$ on which is mounted a hand lever Q movable over a quadrant Q'. The inner ends of the rods P are coupled by a link $P^3$ so that the movement of all the plow shares is performed simultaneously and a certain balancing effect is obtained in this movement. The two plow shares M M' are coupled together by a horizontal rod R which at that end which is directed toward the center of the vehicle is pivotally connected by a drag link R' to the lower part of the guide E. Similarly the two plow shares M² M³ are connected by a rod R² the end of which is in turn coupled by a drag link R³ to the guide member E. These links R' and R³ transmit the pull of the plow shares which are in operation to the guide member E at which place the drive of the vehicle is in effect directly applied through the axle of the wheel C. By means of the hand levers Q either pair of plow shares can be raised or lowered through the links and levers N, O', O³ and P which are duplicated for each set of shares. In Fig. 1 the two plow shares M M' are shown in their raised and inoperative positions where they are retained by locking the hand lever Q in its quadrant Q'. The plow shares M² M³ are shown lowered and in their operative positions where they are left free to rise or fall according to the conditions of the ground. The movement of the links N in the slots O permits this movement of the shares to take place irrespective of the linkage controlling them.

Other constructions of linkage and levers may be employed for the purpose of raising and lowering the plow shares if desired. The arrangement in either case is however such as to permit of a certain free movement of the shares either in their operative positions as is above described while the pull thereon is preferably transmitted to and taken up by some equivalent part of the vehicle such as the guide member E so that when the shares are operating this pull is taken as far as possible horizontally.

The constructional details of the vehicle may be modified to meet requirements.

What I claim as my invention and desire to secure by Letters Patent is:—

1. In a plow, a supporting frame, a plow share disposed at each end of the frame, said plow shares being oppositely directed, and parallel link mechanism connecting the plow shares and frame whereby one plow share may be raised when the other is lowered.

2. In a plow, a supporting frame, a plow share disposed at each end of the frame, said plow shares being oppositely directed, and parallel link mechanism connecting the plow shares and frame whereby one plow share may be raised when the other is lowered, each plow share maintaining its cutting angle when in raised position.

3. In a plow, the combination of a frame, an axle, a plow share on each side of the axle, said plow shares being oppositely directed, a two armed lever mounted on each side of the axle one arm of each lever being slotted, a plow share on each side of the axle and having a pin fitting within the slot of the corresponding lever, whereby it is suspended, a link connecting each plow share to the axle, means connecting the other arms of the levers, means connected to said connecting means for rocking said levers simultaneously whereby one plow share may be raised and the other lowered, simultaneously.

4. In a plow, the combination of a frame, an axle, a plurality of plow shares on each side of the axle, each of said plow shares having its point toward the axle, a plurality of two armed levers mounted on each side of the axle, one arm of each lever being slotted, a plurality of plow shares on each side of the axle, each provided with a pin fitting within the slot of the corresponding lever, whereby it is suspended, links connecting the plow shares to the axle, means connecting the other arms of the two arm levers so that said levers are simultaneously movable, means connected to said connecting means for rocking said levers whereby the plow shares on one side of the axle may be raised and the others lowered, simultaneously.

5. In a plow, the combination of a frame, adapted to support a plurality of plow shares, a slotted bracket or guideway rigidly secured to and extending downwardly from, said frame, a central axle having a vertically adjustable end extending through and guided by said slotted bracket, a plow share on each side of said central axle, means for lowering said plow shares into operative position and raising the same, and links connecting the plow shares to the slotted bracket, whereby the pull of the plow shares is transmitted to the central axle irrespective of its vertical position.

6. In a plow, the combination of a frame, adapted to support a plurality of plow shares, a slotted bracket or guide rigidly secured to and extending downwardly from, said frame, an axle having a vertically adjustable end extending through and guided by said slotted bracket, a plurality of plow shares on each side of said central axle, parallel link mechanism for raising and lowering the plow shares, and means connecting the plow shares to the slotted bracket, whereby the pull of the plow shares is transmitted to the axle irrespective of its vertical position.

7. In a plow, the combination of a frame adapted to support a plurality of plow shares, a guide member secured to said frame and extending downwardly therefrom, an axle having a vertically adjustable end engaging and guided by said guide member, a plow share on each side of said central axle, means for lowering said plow shares into operative position and raising the same, and links connecting the plow shares to the guide member, whereby the pull of the plow shares is transmitted to the central axle irrespective of its vertical position.

8. In a plow, the combination of a frame, a plurality of plow shares, parallel link mechanism connecting said frame and said plow shares for raising and lowering the same, and wheels supporting the frame and plow shares, including a main wheel offset from the plows, for the purpose set forth.

9. In a plow, the combination of a frame, a plurality of plow shares, parallel link mechanism connecting said frame and plow shares for raising and lowering the same, and wheels supporting the frame and plow shares including a narrow guide wheel at each end of the frame and laterally displaced from the plow shares.

In testimony whereof I have signed my name to this specification in the presence of two subscribing witnesses.

THOMAS CHARLES SANTLER.

Witnesses:
BERTRAM EDWARD DUNBAR KILBION,
ARCHIBALD JOHN FRENDE.